United States Patent
Satake

(10) Patent No.: US 6,896,351 B1
(45) Date of Patent: May 24, 2005

(54) IMAGE RECORDING APPARATUS, IMAGE PROCESSING APPARATUS AND METHOD OF CONTROLLING THE SAME

(75) Inventor: Makoto Satake, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 16 days.

(21) Appl. No.: 10/622,475

(22) Filed: Jul. 21, 2003

(30) Foreign Application Priority Data

Jul. 31, 2002 (JP) ........................................ 2002-223732

(51) Int. Cl.[7] ............................ B41J 2/165; H04N 1/21
(52) U.S. Cl. ............................ 347/23; 347/29; 347/30; 347/33; 347/35; 358/296
(58) Field of Search ................................ 347/5, 19, 22, 347/23, 29–35; 358/1.15, 1.12; 399/2

(56) References Cited

U.S. PATENT DOCUMENTS 5,134,424 A * 7/1992 Oomori .......................... 347/5
5,475,404 A * 12/1995 Takahashi et al. ............. 347/23
6,042,214 A * 3/2000 Minowa et al. ............... 347/23

* cited by examiner

Primary Examiner—Shih-wen Hsieh
(74) Attorney, Agent, or Firm—Fitzpatrick, Cella, Harper & Scinto

(57) ABSTRACT

An image processing apparatus for executing recording preparation processing in accordance with a time interval in which a recording operation has not been performed includes a first control unit which controls generation of image data to be recorded, a pseudo-time measuring unit which generates pseudo-time data, a calculation unit which calculates the time interval in which a recording unit is not executing the recording operation in accordance with the pseudo-time data, and a second control unit which determines the recording preparation processing executed before recording the generated image data and controlling the processing based on the determination.

13 Claims, 6 Drawing Sheets ly particularly, the present invention relates to an image record-
IMAGE RECORDING APPARATUS, IMAGE PROCESSING APPARATUS AND METHOD OF CONTROLLING THE SAME

FIELD OF THE INVENTION

The present invention relates to an image recording apparatus for recording images onto a recording medium, an image processing apparatus applied thereto, and a method of controlling the image processing apparatus. More particularly, the present invention relates to an image recording apparatus, an image processing apparatus, and the like, which measure, without using time measuring means, a time interval in which a recording operation is not performed, and control a recovery operation of a recording head according to the measurement result.

BACKGROUND OF THE INVENTION

An image processing apparatus equipped with an ink-jet recording unit (including a recording head) suffers from a problem that, when a recording operation such as copying or printing is not performed for a long period of time, clogging occurs in a nozzle portion of the recording head for ejecting ink, thereby causing a non-ejection state of ink. To solve this problem, there have been several attempts to provide time measuring means (such as an RTC) for generating real time data in a main body control unit of the image processing apparatus to measure a time interval in which the image processing apparatus has not performed a recording operation in accordance with this real time data so that a recovery operation of the recording head may be controlled on the basis of the time interval. For example, in accordance with the measured time interval during non-recording operation, a recording preparation operation is conducted where the number of suction recovery operations for recovering the nozzle portion of the recording head from clogging and an amount of suction are adjusted, thereby eliminating the clogging in the nozzle portion and preventing the occurrence of the non-ejection of ink.

An image processing apparatus whose main body control unit does not have time measuring means such as an RTC for the purpose of the cost reduction is not able to measure the time interval during non-recording operation and thus has difficulty in controlling the suction recovery operation in accordance with the time interval during non-recording operation. In this case, in order to prevent the clogging in the nozzle portion of the recording head in the same manner, the recording head is always subjected to suction under a maximum suction pressure (high suction) so as to eliminate the clogging in the nozzle portion at the recording preparation operation before the recording operation.

However, the image processing apparatus impartially performing the recovery operation by high suction in the recording preparation operation applies the suction recovery operation more than necessary to the recording head even when it has less possibility of causing the clogging in its nozzle portion because the time interval during non-recording operation is actually not so long, and thereby sucks excessive amount of ink in an ink tank of the recording head, consequently increasing ink consumption. Furthermore, the recording preparation operation for initial copying or printing processing at starting of the recording requires a long time period, which causes a reduction of throughput in the image processing apparatus.

The present invention was proposed to address the foregoing problem and an object thereof resides in providing an image processing apparatus and a method of controlling the same, both of which are capable of, even when a main body control unit does not have time measuring means such as an RTC for generating real time data, transmitting pseudo-time data to a recording unit before a recording operation to thereby calculate a time interval in which the recording operation has not been performed, and conducting appropriate recording preparation processing including a suction recovery operation in accordance with the calculation result.

SUMMARY OF THE INVENTION

In order to address the foregoing object, the image processing apparatus and the method of controlling the same are characterized by comprising the following constitutions.

That is, the above-described object of the present invention is achieved by an image processing apparatus comprising: first control means for controlling generation of image data used for recording in a recording unit which records an image onto a recording medium; pseudo-time measuring means for generating pseudo-time data; calculation means for calculating a time interval in which the recording unit is not performing a recording operation in accordance with the generated pseudo-time data; and second control means for determining recording preparation processing to be executed before recording the generated image data in accordance with the time interval calculated by the calculation means and controlling the processing based on the determination.

The above-described object of the present invention is also achieved by a method of controlling an image processing apparatus comprising: a first controlling step of controlling generation of image data to be recorded; a pseudo-time measuring step of generating pseudo-time data; a calculating step of calculating a time interval in which a recording unit is not performing a recording operation in accordance with the generated pseudo-time data; and a second controlling step of determining recording preparation processing to be executed before recording of the generated image data based on the time interval calculated in the calculating step and controlling the processing in accordance with the determination.

Other objects, features, effects and advantages of the present invention will be apparent from the following description, taken in conjunction with the accompanying drawings, in which like reference characters designate the same or similar parts throughout the figures thereof.

DETAILED DESCRIPTION OF THE PREFERRED EMBODIMENTS

Figure 1:
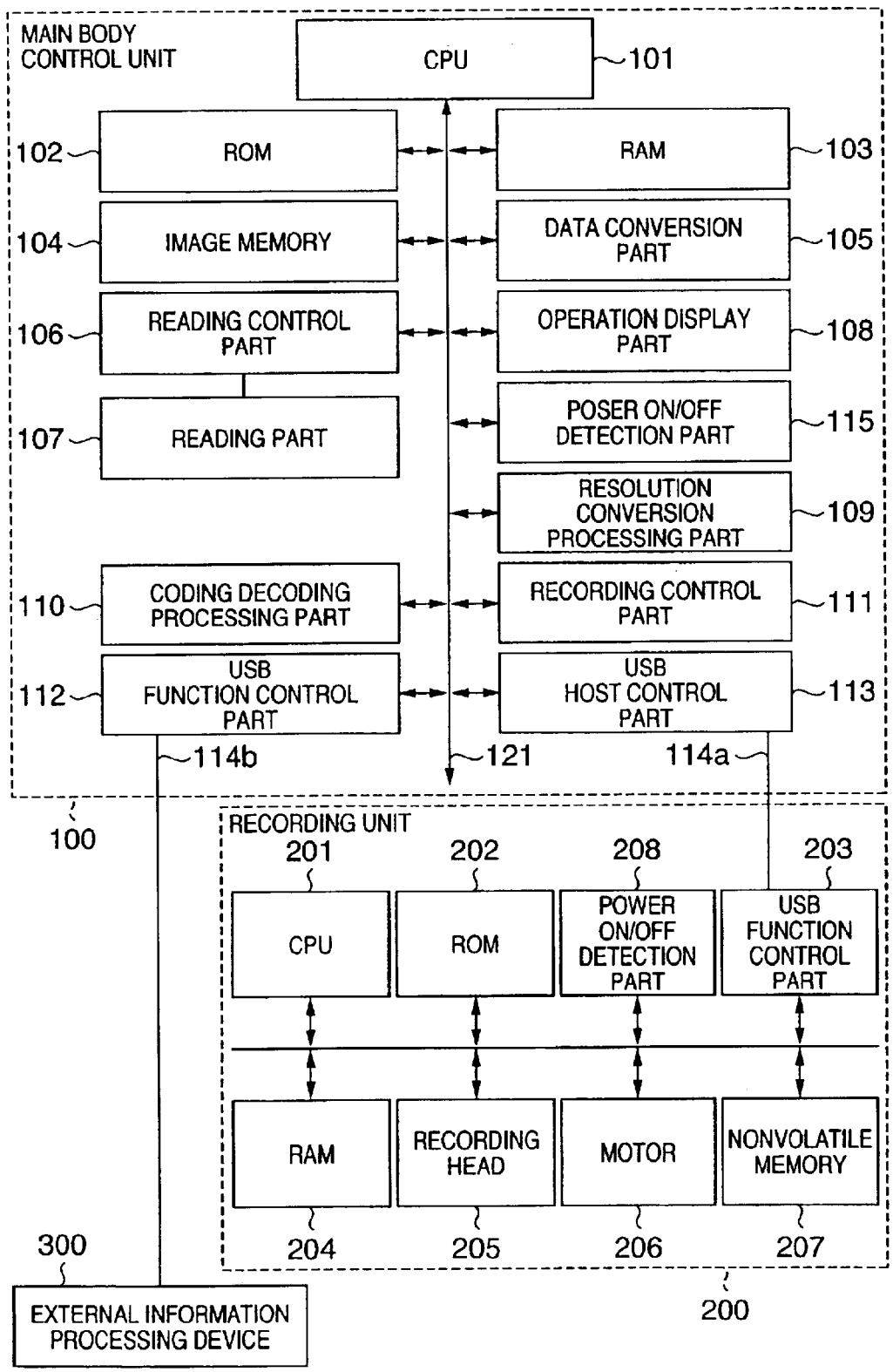
FIG. 1 is a block diagram schematically showing configurations of a main body control unit 100 and a recording unit 200 in an image processing apparatus.

Referring now to the drawings, a preferred embodiment of the present invention will be described below in detail.

The embodiment will be detailed taking an example of a printer as a recording apparatus employing an ink-jet recording system.

In the description, "recording" (possibly described as "printing") not only means forming meaningful information such as character, graphics, etc., but also broadly implies forming images, figures, patterns, etc., onto a recording medium irrespective of whether they are meaningful or not or whether they are made manifest to be visually perceived by human beings or not, and also means processing the recording medium.

In addition, a recovery operation of a recording head refers to an operation for recovering a recording condition of the recording head, and more specifically, to an operation implemented when an unsatisfactory recording result is provided or when it is conceivable that degradation is found in the recording result in order to obtain a satisfactory recording result. For example, in an ink-jet recording apparatus, the recovery operation includes forcible discharging of ink from the recording head, cleaning of a surface on an ejecting port for the ink, or the like.

Furthermore, the term "recording medium" refers not only to papers used in general recording apparatuses, but also to materials onto which ink can be applied, broadly including cloths, plastic films, metal sheets, glasses, ceramics, woods, leathers, etc.

Moreover, the term "ink" (often described as a "liquid"), which is to be understood as broadly as the definition of the term "recording (printing)" above, refers to a liquid to be applied onto a recording medium, which is available to form images, figures, patterns, and the like, to process a recording medium, and to treat the ink (e.g., to solidify or insolubilize a coloring agent in the ink applied to the recording medium).

<Outline of the Main Body of the Apparatus (FIGS. 5 and 6)>

Figure 5:
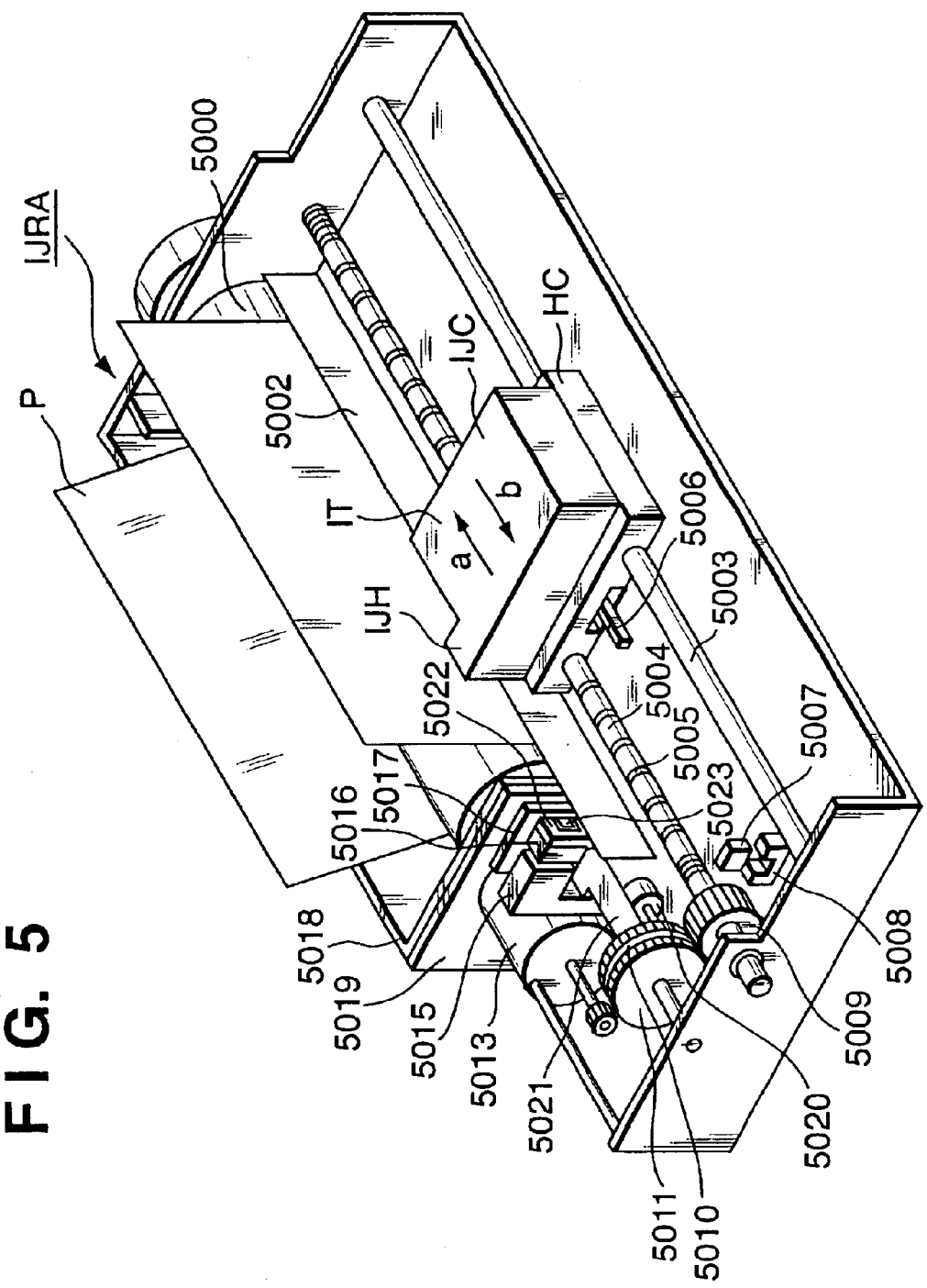
FIG. 5 is a perspective view schematically showing an external appearance of a constitution of an ink-jet printer IJRA in a typical embodiment of the present invention.

FIG. 5 is a perspective view schematically showing an external appearance of a constitution of an ink-jet printer IJRA in a typical embodiment of the present invention. In FIG. 5, a carriage HC, which is engaged with a helical groove 5005 of a lead screw 5004 that is rotated interlockingly with forward-reverse rotation of a drive motor 5013 via driving force transmission gears 5009 to 5011, has a pin (not shown) and is reciprocated in directions of arrows a and b while being supported by a guide rail 5003. An integrated ink-jet cartridge IJC which incorporates a recording head IJH and an ink tank IT is mounted on the carriage HC.

A sheet press plate 5002 presses a recording sheet P against a platen 5000 over the entire range of movement of the carriage HC. A photocoupler 5007, 5008 is a home-position detector for performing switching of the direction of revolution of the driving motor 5013 by ascertaining the presence of a lever 5006 of the carriage HC within the above-described range.

A member 5016 supports a cap member 5022 for capping a front surface of the recording head IJH, and a suction unit 5015 sucks the inside of the capped portion in order to perform suction recovery of the recording head via an opening 5023 in the capped portion. Reference numeral 5017 denotes a cleaning blade, and reference numeral 5019 denotes a member which allows the movement of the cleaning blade in forward and reverse directions. Both the cleaning blade 5017 and the member 5019 are supported on a supporting plate 5018 provided on the main body of the apparatus. It is to be understood here that the cleaning blade is not limited to the illustrated type and well-known cleaning blades are definitely applicable to this embodiment.

A lever 5021 initiates suction for suction recovery, and is moved in accordance with the movement of a cam 5020 which is engaged with the carriage HC. A driving force from the driving motor 5013 is controlled for this movement via a known transmission mechanism, such as clutch switching or the like.

Each of these capping, cleaning and suction recovery operations is configured so that desired processing can be performed at a corresponding position by the operation of the lead screw 5004 when the carriage HC reaches a region at the home position side, and can be applied to this embodiment so that a desired operation is performed at a well-known timing.

The ink tank IT and the recording head IJH may be integrally formed to provide the exchangeable ink cartridge IJC, although the ink tank IT and the recording head IJH may be separately formed, so that only the ink tank IT can be exchanged when ink is used up.

Figure 6:
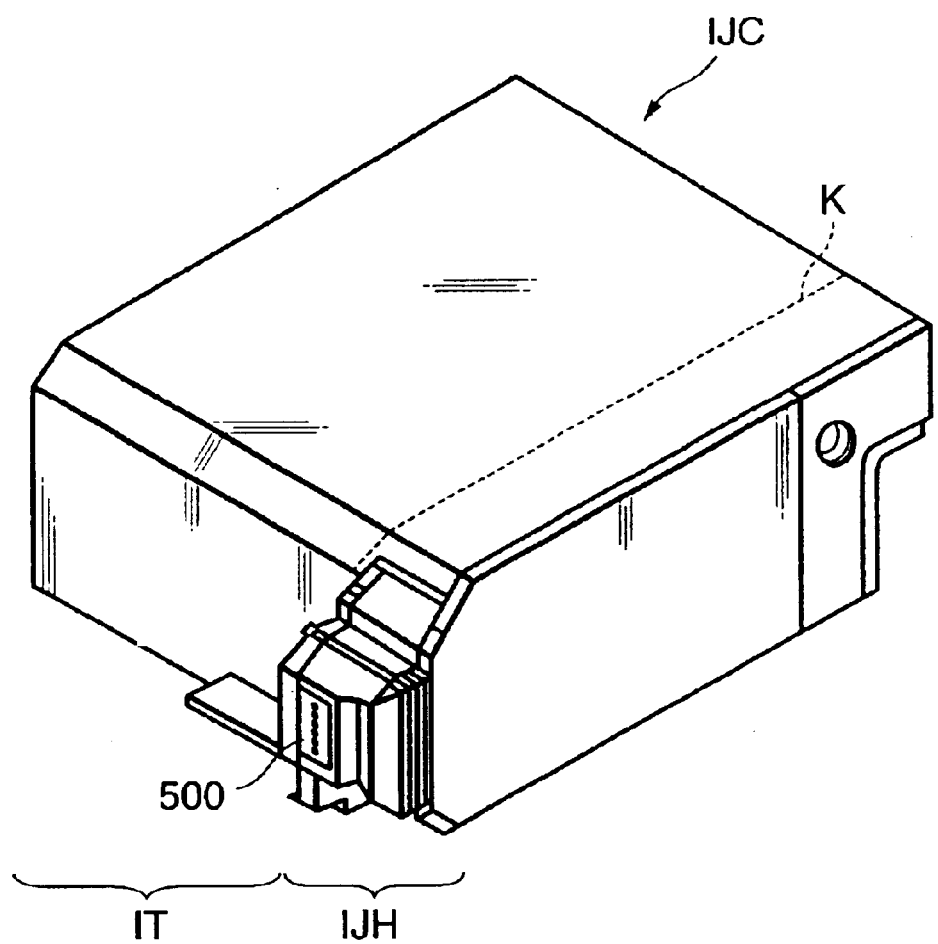
FIG. 6 is a perspective view schematically showing a constitution of an ink-jet cartridge IJC whose ink tank and head are detachable from each other.

FIG. 6 is a perspective view showing an external appearance of the ink cartridge IJC in which the ink tank IT and the recording head IJH can be separated from each other. As shown in FIG. 6, the ink tank IT and the recording head IJH of the ink cartridge IJC can be separated from each other at the position of a border line K. To the ink cartridge IJC is provided electrodes (not shown) for receiving an electrical signal supplied from the carriage HC when the ink cartridge IJC is mounted on the carriage HC. According to this electrical signal, the recording head IJH is driven in the above-described manner, to eject ink.

In FIG. 6, reference numeral 500 denotes columns of ink ejecting ports. The ink tank IT has a fibrous or porous ink absorbing element for retaining therein ink.

<Configurations of Control Unit and Recording Unit (FIG. 1)>

FIG. 1 is a block diagram schematically illustrating configurations of a main body control unit 100 and a recording unit 200 in the image processing apparatus. The main body control unit 100 executes operations other than a recording operation for image data, that is, functions of reading images, managing image memory, operating users, or the like. The recording unit 200 is a recording device including an ink-jet printer, which receives image data, time data, and the like transmitted from the main body control unit 100 via a USB interface and records the image data onto a recording medium such as papers.

In the main body control unit 100, a CPU 101 is responsible for system control and governs the entire image processing apparatus. The CPU 101 generates the time data based on a system clock thereof, which means that the CPU 101 works as time measuring means in addition to controlling the entire apparatus.

A ROM 102 stores control programs and embedded operating system (OS) programs executed by the CPU 101. Each control program stored in the ROM 102 conducts software control including scheduling and task switching under the control of the embedded OS stored in the ROM 102.

The RAM 103 is composed of an SRAM (static RAM) or the like, stores program control variables, setting values entered by an operator, management data of the image processing apparatus, or the like, and has a buffer area for various uses. The time data formed by the CPU 101 in this embodiment is stored in this RAM 103.

An image memory 104 is composed of a DRAM (dynamic RAM) or the like, and is able to store image data. A data conversion part 105 is able to perform image data conversion including analysis of a page description language (PDL) and the like and CG (computer graphics) development of character data.

A reading control part 106 applies various image processings such as binarization and halftoning via an image processing control part, which is not shown, to image signals provided by a reading part 107 which optically reads a document by a CIS image sensor (contact image sensor) and converts it into electrical image data, and the reading control part 106 then outputs high-definition image data. The reading control part 106 supports both a sheet reading control method of reading a document while feeding it and a book reading control method of scanning a document on a table that the document is to be placed on.

An operation display part 108 includes an operation portion having numerical value input keys, character input keys, one-touch telephone number keys, a mode setting key, a determination key, a cancel key, or the like, used when a user determines a destination to transmit images or enters setting data, and further includes a display portion composed of several keys, an LED (light-emitting diode), an LCD (liquid crystal display), and the like, for displaying various operations inputted by an operator, an operation status of the image processing apparatus, or other status conditions.

A resolution conversion processing part 109 controls resolution conversion such as millimeter-to-inch resolution conversion of image data or the like. The resolution conversion processing part 109 is also capable of magnifying and reducing image data.

A coding decoding processing part 110 encodes or decodes and magnifies or reduces image data (MH, MR, MMR, JBIG, JPEG, etc.) handled in the image processing apparatus. A recording control part 111 applies various image processings including smoothing, recording density correction, and color correction via the image processing control part, which is not shown, to image data to be printed, in order to convert it into high-definition image data, then outputs the converted image data to a USB host control part 113. The recording control part 111 controls the USB host control part 113 to thereby function to periodically acquire status information data of the recording unit 200.

A USB function control part 112, which is responsible for controlling communication over a USB interface, controls protocols in conformity with USB protocols, and converts data from USB control tasks executed by the CPU 101 into packets to transmit them as USB packets to an external information processing terminal, or inversely, converts USB packets coming from the external information processing terminal into data to provide it to the CPU 101.

The USB host control part 113 is a controller to conduct communication in accordance with protocols provided by USB protocols. The USB protocols allow high-speed two-way data communication, and also enable connection of multiple hubs or functions (slaves) relative to one host (master). The USB host control part 113 serves as a host in USB communication.

A power ON/OFF detection part 115 is a sensor for detecting an ON/OFF state of the power of the main body control unit, and the CPU 101 controls data to be transmitted to the recording unit 200 according to the detection result obtained from this sensor.

A CPU 201 is responsible for controlling each part inside the recording unit 200, and controls mainly the image recording processing. A ROM 202 stores program codes, initial value data, table data, font data, or the like in the recording unit 200.

A USB function control part 203 which is responsible for controlling communication over a USB interface, controls protocols in conformity with USB protocols, and performs data communication via the USB interface internally connecting the main body control unit 100 and the recording unit 200 with each other.

A RAM 204 comprises a receiving buffer, raster buffer, print buffer, work area, etc., in the recording unit 200. The recording head 205 (IJH in FIG. 5) has a plurality of nozzles from which ink is ejected onto a recording medium to execute recording. A motor 206 is a driving part for activating delivery of the recording medium, movement for scanning of the recording head 205, and a suction operation to recover a group of nozzles of the recording head 205.

A nonvolatile memory 207 stores time data and the like transmitted from the main body control unit 100, and is composed of an NVRAM or the like. By determining the difference between the time data at starting of the preceding recording operation that is stored in this memory and the time data at starting of the present recording operation, a time interval in which recording has not been performed may be calculated.

A power ON/OFF detection part 208 is a sensor for detecting an ON/OFF state of the power of the recording unit 200, and the CPU 201 controls switching of contents of recording preparation processing for the recording head 205 according to the detection result obtained from this sensor.

<Sequence of Forming Time Data (FIG. 2)>

Figure 2:
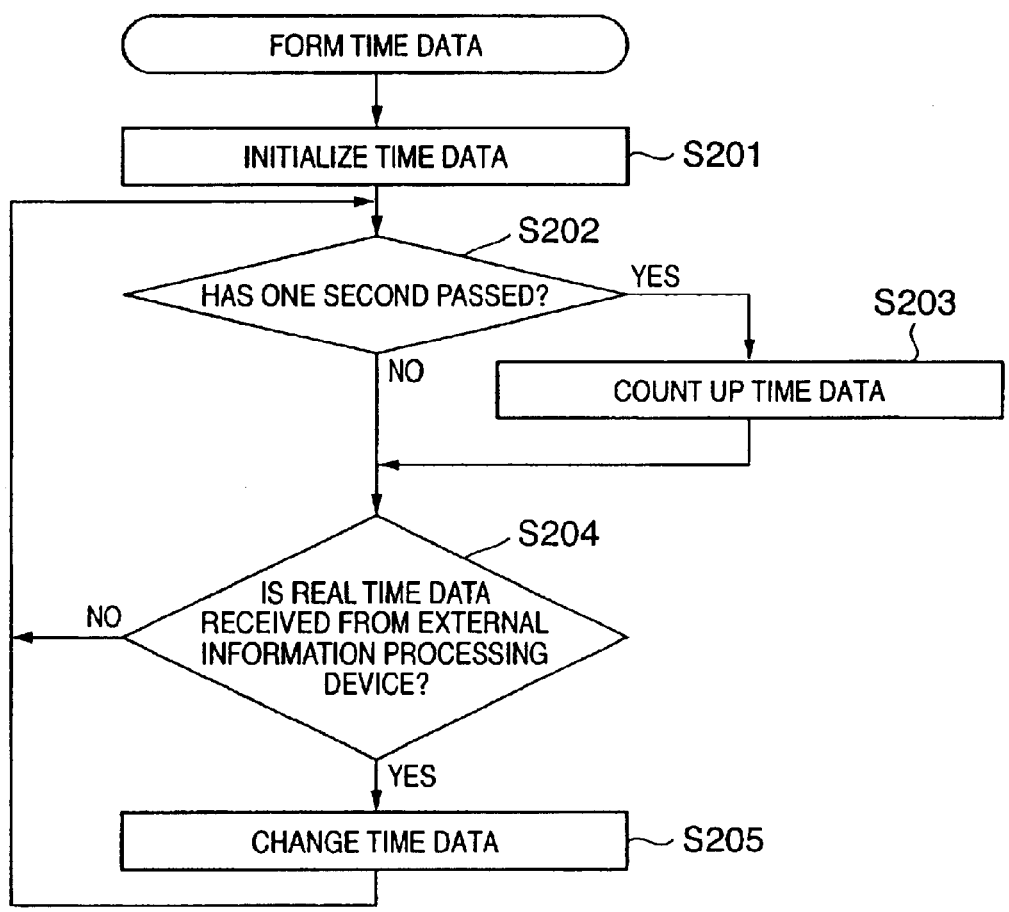
FIG. 2 is a flowchart illustrating a processing flow of creating time data in the image processing apparatus according to an embodiment.

FIG. 2 is a flowchart illustrating a flow of time data forming processing in the image processing apparatus according to this embodiment.

First, in step S201, an initial value or a backup value is set in a time data storage area allocated in the RAM 103 of the main body control unit 100 in order to initialize time data. Next, a system clock of the CPU 101 is counted and it is determined whether a fixed reference period of time, for example, one second, has passed or not (step S202). In step S202, when it is determined that one second has passed (step S202-YES), the time data in the time data storage area allocated in the RAM 103 is counted up (step S203). When the determination result indicates that one second has not passed (step S202-NO), the processing advances to step S204.

In step S204, it is determined whether real time data is received from an external information processing device connected to the image processing apparatus, and when the real time data is received (step S204-YES), the time data in the time data storage area allocated in the RAM 103 is overwritten with this real time data (step S205).

In step S204, when it is determined that the real time data is not received (step S204-NO), the processing returns to step S202.

The time data is thus formed according to the foregoing processing. Time data indicates, when it is the data counted up in step S203, pseudo-time data measured by counting the system clock of the CPU 101. When the real time data is received from the external information processing device in step S204, such real time data is utilized as the time data.

The USB host control part 113 transmits the time data stored in the RAM 103 of the main body control unit 100 to the recording unit 200 via the USB interface.

<Recording Operation Processing in Main Body Control Unit (FIG. 3)>

Figure 3:
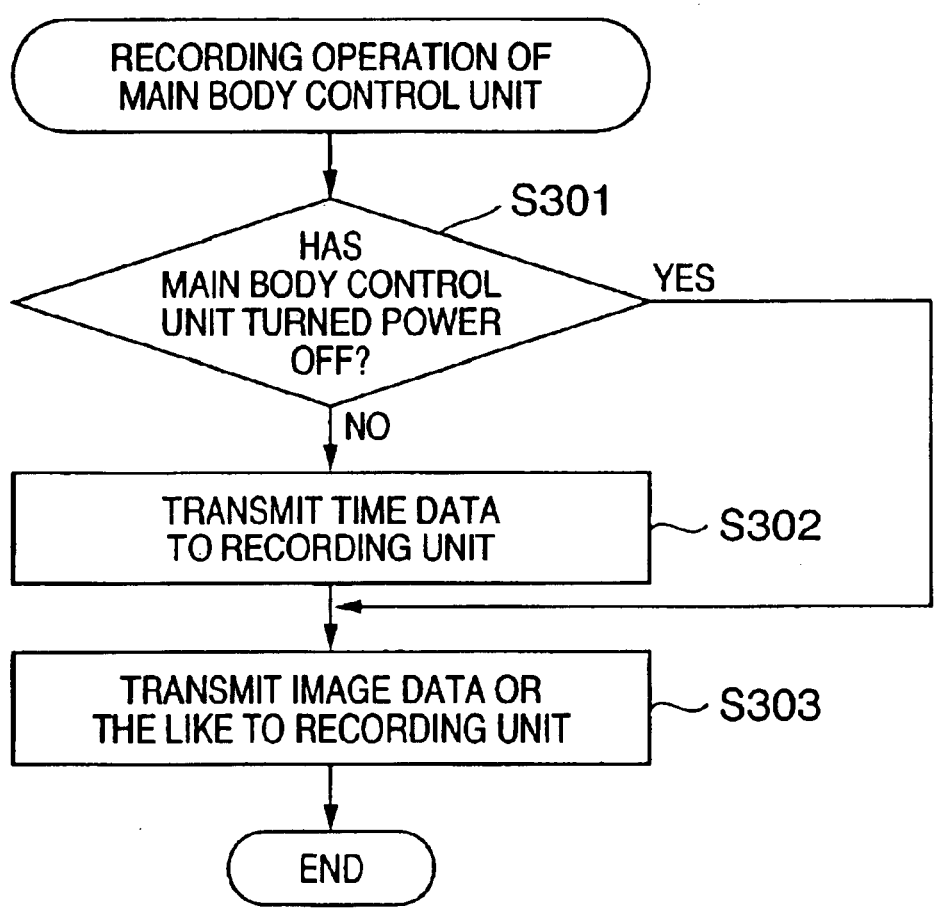
FIG. 3 is a flowchart showing a flow of recording control of the main body control unit 100 in the image processing apparatus according to the embodiment.

FIG. 3 is a flowchart showing a flow of recording control of the main body control unit 100 in the image processing apparatus according to the embodiment.

First, in step S301, it is determined whether the main body control unit 100 has turned the power of the image processing apparatus OFF or not. When the power is turned OFF (step S301-YES), the processing advances to step S303. When the power is not turned OFF (step S301-NO), the processing advances to step S302, and the main body control unit 100 transmits the time data stored in the RAM 103 to the recording unit 200 via the USB interface (114a (FIG. 1)) (step S302).

After transmitting the time data, the main body control unit 100 also transmits, in step S303, image data, recording setting commands, or the like, to the recording unit 200 and then terminates the processing.

At this point, transmission/reception processing of various data including the time data is controlled by the USB host control part 113 under the overall control by the CPU 101 in the main body control unit 100.

<Recording Operation Processing of Recording Unit (FIG. 4)>

Figure 4:
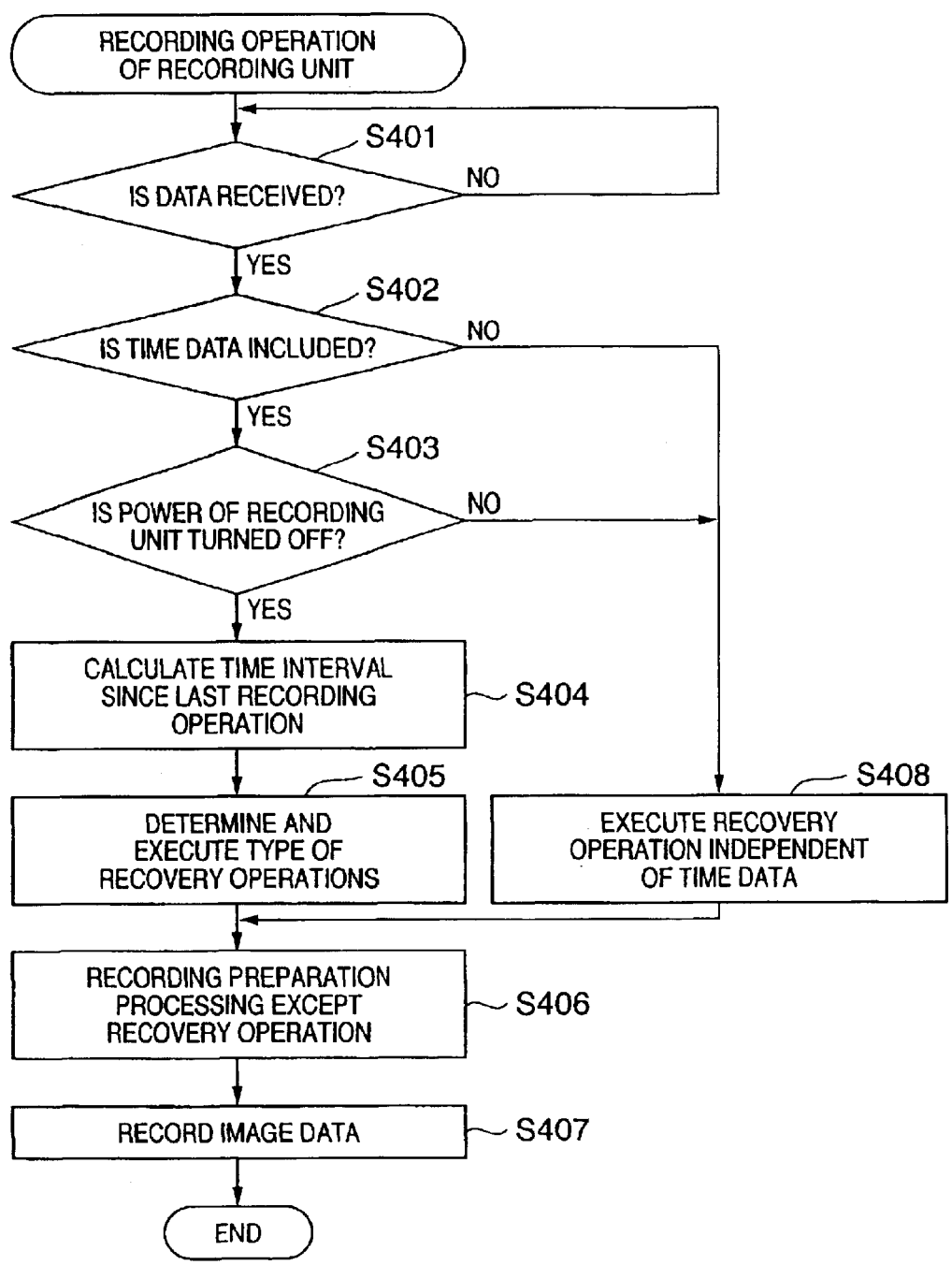
FIG. 4 is a flowchart showing a recording operation of the recording unit 200 in the image processing apparatus according to the embodiment.

FIG. 4 is a flowchart showing the recording operation of the recording unit 200 in the image processing apparatus according to this embodiment.

First, in step S401, it is determined whether the recording unit 200 has received some data from the main body control unit 100 via the USB interface 114a or not. When it is determined that it has received some data (step S401-YES), it is further determined whether the received data includes time data or not (step S402). When the received data does not include the time data (step S402-NO), the processing advances to step S406.

In step S402, when it is determined that the time data exists in the received data (step S402-YES), the processing advances to step S403, and it is determined whether the power of the recording unit 200 is turned OFF or not (step S403).

In step S403, when it is determined that the power is not turned OFF (step S403-NO), the processing advances to step S406. When the power is turned OFF (step S403-YES), the recording unit 200 calculates, based on the received time data, a time interval in which recording has not been executed since the preceding recording operation until the present recording operation (step S404). This time interval, in which the recording head 205 has not performed the recording operation, is calculated under the control of the CPU 201 in the recording unit 200 by determining the difference between the time data related to the preceding recording stored in the nonvolatile memory 207 and the received present time data.

In step S405, in accordance with the time interval during non-recording operation which is calculated in step S404, the recording unit 200 selects one of three levels of suction recovery operations: "No recovery"; "low recovery"; and "high recovery", in the recording preparation operation, and then executes the selected level of the recovery operation.

In step S406, the recording unit 200 performs a recording preparation processing other than the recovery operation, such as setting of recording parameters.

In step S407, the recording unit 200 executes the recording processing of the image data in the data received in step S401.

In step S408, since the recording unit 200 cannot obtain the time data based on the system clock of the CPU 101 when the power of the main body control unit 100 goes into an OFF state (step S301-YES), a uniform recovery operation by high suction is performed irrespective of the time interval during non-recording operation.

In the processings shown in FIGS. 3 and 4, even when it is detected that the power of the recording unit 200 is turned into the OFF state (step S403-YES), as long as the power of the main body control unit 100 is in the ON state (step S301-NO), the recording unit 200 is able to calculate the time interval during non-recording operation on the basis of time data formed in pseudo-time measuring means (the system clock of the CPU 101 in this embodiment) of the main body control unit 100, and is therefore able to provide appropriate recording preparation processing by switching in stages the suction recovery operations to, for example, "No recovery", "low recovery", or "high recovery" according to the above-calculated time interval. This prevents an increase in a suction amount of ink due to the excessive recovery operation and a reduction in throughput of the recording processing due to the delayed recording preparation processing after the power is turned ON.

When it is detected that the power of the main body control unit 100 is turned into the OFF state, the time data is not formed by means of pseudo-time measuring means utilizing the system clock because the CPU 101 of the main body control unit 100 is deactivated. In this case, the time data is not transmitted to the recording unit (step S302 in FIG. 3 is skipped and the processing advances to step S303), and the uniform recovery operation in a conventional manner, which is the high suction, is conducted irrespective of the time interval during non-recording operation (step S408), thereby eliminating the clogging of the nozzle and preventing the occurrence of non-ejection of the ink.

Also, when the main body control unit 100 receives the real time data by establishing connection with the external information processing device 300, the main body control unit 100 transmits the received real time data to the recording unit 200 as the time data. The recording unit 200 uses this time data to calculate the time interval in which the recording operation has not been performed (step S403).

Even when the powers of both the main body control unit 100 and the recording unit 200 are turned OFF and thereafter turned ON (power OFF/ON), the uniform recovery operation by high suction is not performed as in the conventional case, but an appropriate recording processing, which includes the suction recovery operation in accordance with the time interval during non-recording operation, is allowed to be selected through receiving the real time data. When the real time data is received from the external information processing device 300, the time data formed in the main body control unit 100 is changed to this real time data, thereby enabling to obtain the consistency between the real time data received from the external information processing device and the time data in the main body control unit (step S205 in FIG. 2).

Also when the recording operation where data processing is performed in only the main body control unit 100 just as in the case of copying, and printing where data is being received from the external information processing device, are alternately performed wherein the recording unit 200 is subjected to power OFF/ON operation, the transmission of the same time data to the recording unit 200 allows it to accurately calculate the time interval in which the recording unit has not performed the recording operation and to select an appropriate recording preparation processing including the suction recovery operation in accordance with the time interval during non-recording operation.

In the foregoing description, droplets ejected from the recording head are described as being ink and the liquid contained in the ink tank is described as ink; however, the liquid is not limited to ink. The liquid in the ink tank may be, for example, a treatment liquid or the like to be ejected onto a recording medium, which is effective to enhance a fixative property or water-proofing of the recorded image and to increase the quality of the image.

Furthermore, the above-described embodiment can attain higher density and definition recording by providing means for producing thermal energy (e.g., electrothermal converting element, laser light, etc.) which is utilized to activate ink ejection and by using a system for effecting state changes of the ink with such thermal energy among the ink-jet recording systems.

As described above, according to the present invention, even when the main body control unit does not include time measuring means operable to generate real time data, the recording unit receives pseudo-time data before a recording operation to thereby calculate a time interval in which the recording operation has not been performed, thus allowing the suction recovery operation in accordance with the calculation result.

Alternatively, the excessive suction recovery operation is suppressed, thereby preventing an increase in an amount of ink suction and a reduction in throughput of recording processing due to delayed recording preparation processing after the power is turned ON.

Alternatively, when real time data can be received from the external information processing device, the recovery operation may be controlled in accordance with this real time data.

The present invention is not limited to the above embodiments and various changes and modifications can be made within the spirit and scope of the present invention. Therefore, to apprise the public of the scope of the present invention, the following claims are made.

What is claimed is:

1. An image recording apparatus comprising:
   a recording unit operable to record an image onto a recording medium using a recording head;
   recovery means for performing a recovery operation to recover a condition of recording by the recording head;
   an image data generation unit operable to generate image data of the image to be recorded in the recording unit;
   pseudo-time measuring means for generating pseudo-time data;
   calculation means for calculating a time interval in which the recording unit is not performing a recording operation in accordance with the generated pseudo-time data; and
   control means for determining the recovery operation to be executed before recording the generated image data in accordance with the time interval calculated by the calculation means and controlling the recovery operation by the recovery means based on the determination.

2. The image recording apparatus according to claim 1, wherein
   the recording head is an ink-jet type recording head which ejects ink for recording, and
   the recovery means performs the recovery operation by discharging the ink from the recording head.

3. An image processing apparatus comprising:
   first control means for controlling generation of image data used for recording in a recording unit which records an image onto a recording medium;
   pseudo-time measuring means for generating pseudo-time data;
   calculation means for calculating a time interval in which the recording unit is not performing a recording operation in accordance with the generated pseudo-time data; and
   second control means for determining recording preparation processing to be executed before recording the generated image data in accordance with the time interval calculated by the calculation means and controlling the processing based on the determination.

4. The image processing apparatus according to claim 3, further comprising:
   first detection means for detecting a power state of the first control means; and
   second detection means for detecting a power state of the second control means,
   wherein the second control means executes the recording preparation processing irrespective of the pseudo-time data either when the first detection means detects power-OFF or when the second detection means does not detect power-OFF.

5. The image processing apparatus according to claim 3, further comprising:
   an interface that establishes connection with an external information processing device having time measuring means capable of generating real time data and receives the real time data; and
   data control means for processing the received real time data,
   wherein the data control means switches the pseudo-time data to the real time data when the interface receives the real time data.

6. The image processing apparatus according to claim 5, wherein the calculation means calculates a time interval in which the recording unit is not performing the recording operation in accordance with the switched real time data.

7. The image processing apparatus according to claim 3, wherein
   the recording unit includes an ink-jet recording head which records by ejecting ink, and
   the recording preparation processing includes recovery processing by suction for the recording head.

8. The image processing apparatus according to claim 3, wherein the recording unit includes a recording head which ejects ink utilizing thermal energy and has a thermal energy converting element for generating the thermal energy to be applied to the ink.

9. A method of controlling an image processing apparatus comprising:
   a first controlling step of controlling generation of image data to be recorded;
   a pseudo-time measuring step of generating pseudo-time data;
   a calculating step of calculating a time interval in which a recording unit is not performing a recording operation in accordance with the generated pseudo-time data; and
   a second controlling step of determining recording preparation processing to be executed before recording of the generated image data based on the time interval calculated in the calculating step and controlling the processing in accordance with the determination.

10. The method of controlling an image processing apparatus according to claim 9, further comprising:
    a first detecting step of processing detection of a power state of first control means for controlling generation of the image data to be recorded; and
    a second detecting step of processing detection of a power state of second control means for controlling the processing in accordance with the determination,
    wherein the second controlling step includes a step of executing the recording preparation processing irrespective of the pseudo-time data either when power-OFF is detected in the first detecting step or when power-OFF is not detected in the second detecting step.

11. The method of controlling an image processing apparatus according to claim 9, further comprising:

a receiving step of establishing connection with an external image processing device having time measuring means capable of generating real time data and receiving the real time data; and a data controlling step of processing the received real time data, wherein the data control step includes a step of switching the pseudo-time data to the real time data when the real time data is received in the receiving step.

12. The method of controlling an image processing apparatus according to claim 11, wherein the calculating step includes a step of calculating the time interval in which the recording unit is not performing the recording operation in accordance with the switched real time data.

13. A program for controlling an image processing apparatus, the program causing a computer to execute:

a first controlling step of controlling generation of image data to be recorded;

a pseudo-time measuring step of generating pseudo-time data;

a calculating step of calculating a time interval in which a recording unit is not performing a recording operation in accordance with the generated pseudo-time data; and a second controlling step of determining recording preparation processing to be executed before recording of the generated image data based on the time interval calculated in the calculating step and controlling the processing in accordance with the determination.

* * * * *